United States Patent
Lin et al.

(10) Patent No.: US 9,743,110 B2
(45) Date of Patent: Aug. 22, 2017

(54) METHOD OF 3D OR MULTI-VIEW VIDEO CODING INCLUDING VIEW SYNTHESIS PREDICTION

(71) Applicant: HFI Innovation Inc., Zhubei, Hsinchu County (TW)

(72) Inventors: Jian-Liang Lin, Su'ao Township, Yilan County (TW); Yi-Wen Chen, Taichung (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

(21) Appl. No.: 15/303,919

(22) PCT Filed: Sep. 25, 2015

(86) PCT No.: PCT/CN2015/090667
§ 371 (c)(1),
(2) Date: Oct. 13, 2016

(87) PCT Pub. No.: WO2016/054979
PCT Pub. Date: Apr. 14, 2016

(65) Prior Publication Data
US 2017/0034529 A1    Feb. 2, 2017

Related U.S. Application Data

(60) Provisional application No. 62/061,834, filed on Oct. 9, 2014.

(51) Int. Cl.
*H04N 19/597* (2014.01)
*H04N 19/109* (2014.01)
(Continued)

(52) U.S. Cl.
CPC ......... *H04N 19/597* (2014.11); *H04N 19/109* (2014.11); *H04N 19/176* (2014.11);
(Continued)

(58) Field of Classification Search
CPC .. H04N 19/597; H04N 19/176; H04N 19/184; H04N 19/52; H04N 19/70; H04N 19/109; H04N 21/816
See application file for complete search history.

(56) References Cited

U.S. PATENT DOCUMENTS

2013/0114717 A1\* 5/2013 Zheng .............. H04N 19/00642
375/240.14
2013/0195188 A1\* 8/2013 Sugio ............... H04N 19/00721
375/240.14
(Continued)

FOREIGN PATENT DOCUMENTS

CN    103747264    4/2014
CN    103907346    7/2014
(Continued)

OTHER PUBLICATIONS

International Search Report dated Dec. 11, 2015, issued in application No. PCT/CN2015/090667.
(Continued)

*Primary Examiner* — Sath V Perungavoor
*Assistant Examiner* — Howard D Brown, Jr.
(74) *Attorney, Agent, or Firm* — McClure, Qualey & Rodack, LLP

(57) ABSTRACT

A method and apparatus for 3D (three-dimensional) and multi-view video encoding or decoding of dependent-view texture or depth data using Merge mode with modified list size according to one or more 3D enabling flags are disclosed. An extra-candidate-number indicating one or more extra Merge candidates for the current block is determined according to one or more 3D enabling flags comprising a VSP (view synthesis prediction) flag. A modified list size for a 3D Merge list corresponding to a sum of the extra-candidate-number and an original list size is determined. The 3D Merge list with the modified list size is then
(Continued)

determined based on original Merge candidates used to derive the base-view Merge list for video data in a base view and one or more 3D Merge candidates as enabled by the 3D enabling flags according to a priority order.

19 Claims, 2 Drawing Sheets

(51) Int. Cl.
    *H04N 19/52*     (2014.01)
    *H04N 19/70*     (2014.01)
    *H04N 19/176*     (2014.01)
    *H04N 19/184*     (2014.01)
    *H04N 21/81*     (2011.01)

(52) U.S. Cl.
    CPC ........... *H04N 19/184* (2014.11); *H04N 19/52* (2014.11); *H04N 19/70* (2014.11); *H04N 21/816* (2013.01)

(56) References Cited

U.S. PATENT DOCUMENTS

2014/0314147 A1* 10/2014 Rusanovskyy ...... H04N 19/597 375/240.12
2014/0376633 A1* 12/2014 Zhang ................ H04N 19/105 375/240.16
2015/0189323 A1* 7/2015 An ...................... H04N 19/597 375/240.16
2015/0201216 A1 7/2015 Lin et al.

FOREIGN PATENT DOCUMENTS

| WO | WO 2013/070757 | 5/2013 |
| WO | WO 2014/053086 | 4/2014 |
| WO | WO 2014/075625 | 5/2014 |

OTHER PUBLICATIONS

Tech, G., et al.; "3D-HEVC Draft Text 5;" Joint Collaborative Team on 3D Video Coding Extensions of ITU-T SG 16 WP 3 and ISO/IEC JTC 1/SC 29/WG 11; Jul. 2014; pp. 1-94.

Zou, F., et al.; "View Synthesis Prediction Using Skip and Merge Candidates for HEVC-Based 3D Video Coding;" IEEE: 2013; pp. 57-60.

Tian, D., et al.; "Analysis of view synthesis prediction architectures in modem coding standards;" Proc. of SPIE; 2013; pp. 1-10.

Lin, J.L., et al.; "A cleanup of the size derivation for 3D-HEVC merge candidate list;" Joint Collaborative Team on 3D Video Coding Extensions of ITU-T SG 16 WP 3 and ISO/IEC JTC 1/SC 29/WG 11; Oct. 2014; pp. 1-2.

* cited by examiner

METHOD OF 3D OR MULTI-VIEW VIDEO CODING INCLUDING VIEW SYNTHESIS PREDICTION

CROSS REFERENCE TO RELATED APPLICATIONS

The present invention claims priority to U.S. Provisional Patent Application, Ser. No. 62/061,834, filed on Oct. 9, 2014. The U.S. Provisional Patent Application is hereby incorporated by reference in its entirety.

TECHNICAL FIELD

The present invention relates to three-dimensional (3D) and multi-view video coding. In particular, the present invention relates to derivation of Merge candidate list for three-dimensional coding including VSP (View Synthesis Prediction) of texture and depth data.

BACKGROUND

Three-dimensional (3D) television has been a technology trend in recent years that intends to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

In HEVC (High Efficiency Video Coding) based three-dimensional coding standard (3D-HEVC) or multi-view coding, the independent base-view for the texture is coded using the base coder, which corresponds to a regular video coder such as the standard HEVC coder for video sequence. On the other hand, the depth map and the dependent-view texture are coded using the 3D enhancement coder, such as the 3D-HEVC coder, where utilizes the coded independent base-view for the texture.

In 3D video coding, prediction associated with Inter prediction (i.e., temporal prediction) and inter-view prediction may require signaling of related motion information, such as the motion vector (MV), reference picture index and reference picture list for Inter coding and disparity vector (DV) for inter-view prediction. In order to signal the motion information efficiently, a coding mode, named Merge mode, has been used. In the Merge mode, a Merge candidate list is generated. If a Merge candidate is selected from the list, the motion information for the current block is encoded or decoder to have the same motion information as the selected Merge candidate. The Merge index for the selected Merge candidate is signaled at the encoder side and parsed at the decoder side.

In 3D-HEVC as described in JCT3V-I1003 (Chen, et al., "*Test Model 9 of 3D-HEVC and MV-HEVC*", Joint Collaborative Team on Video Coding (JCT-VC) of ITU-T SG16 WP3 and ISO/IEC JTC1/SC29/WG11 9th Meeting: Sapporo, J P, 3-9 Jul. 2014, Document: JCT3V-I1003), the Merge candidates for texture and depth in the dependent view are shown in Table 1. The Merge candidates indicated in the Italic font are the extra merge candidates (also named extra 3D candidates) in the 3D-HEVC candidate list in addition to the merge candidates used for base-view texture data.

TABLE 1

| Texture | Depth |
| --- | --- |
| Interview motion prediction (IVMP) candidate | Texture Merge candidate (MPI) |
| $A_1$ | DDD |
| $B_1$ | IVMP candidate |
| $B_0$ | $A_1$ |
| DV | $B_1$ |
| VSP | $B_0$ |
| $A_0$ | $A_0$ |
| $B_2$ | $B_2$ |
| Shift IVMP | Temporal |
| Shift DV | |
| Temporal | |

In Table 1, the Merge candidates for base-view texture video data include five spatial Merge candidates, A0, A1, B0, B1 and B2 and one temporal Merge candidate. The five spatial Merge candidates are derived from spatial neighboring blocks, where the block locations are shown in FIG. 1A. The temporal Merge candidate T0 is shown in FIG. 1B. The spatial Merge candidates and the temporal Merge candidate are used in the conventional HEVC (also named as non-3D-HEVC) as well as in the 3D-HEVC.

In Table 1, MPI represents the Merge candidate for motion parameter inheritance (MPI). In this case, the depth block inherits the motion characteristics of its corresponding texture block. DDD represents the Merge candidate derived according to disparity derived depth (DDD) coding, which is applied to Inter-coded PUs. Thus, a depth value can be derived from its corresponding disparity vector. On the other hand, DV corresponds to disparity vector (DV) based Merge candidate and IVMP represents the Merge candidate derived from Inter-view motion prediction. Furthermore, a shifted IVMP and DV may also be included in the Merge list. The candidates are inserted into the Merge list according to a priority order. When the size of the Merge list reached the maximum number, the Merge list is full and no more candidates are inserted. The candidates listed in Table 1 are according to the priority order from top to bottom. For example, IVMP candidate will be added to the texture Merge list first if the IVMP candidate exists. Candidate $A_1$ will be inserted following the IVMP candidate if candidate $A_1$ exists. Similarly, candidate $B_1$ will be inserted following candidate $A_1$ if candidate $B_1$ exists, and so on.

In order to reduce the complexity, the 3D-HEVC Merge candidates (i.e., the extra candidates in Table 1) except for VSP (view synthesis prediction) inheritance are removed for PUs (prediction units) with block sizes of 8×4 and 4×8. The Merge candidate sets for HEVC, 3D-HEVC Texture/Depth with PU larger or equal to 8×8, and the 3D-HEVC Texture with 8×4/4×8 PU in the draft 3D-HEVC standard version 11.0 are illustrated in the following Table 2. As shown in Table 2, bi-predictive (combined-Bi) candidate and zero-valued vector (Zero) candidate are used as well. The VSP inheritance candidate corresponds to a merged candidate that is VSP coded.

TABLE 2

| | 3D-HEVC Texture (>=8 × 8 PU) | 3D-HEVC Depth (>=8 × 8 PU) | 3D-HEVC Texture (8 × 4/4 × 8 PU) | HEVC/ 3D-HEVC Depth (8 × 4/ 4 × 8 PU) |
|---|---|---|---|---|
| Merge cand. | MPI | | | |
| | | DDD | | |
| | IVMP | IVMP | | |
| | $A_1$ | $A_1$ | $A_1$ | $A_1$ |
| | $B_1$ | $B_1$ | $B_1$ | $B_1$ |
| | $B_0$ | $B_0$ | $B_0$ | $B_0$ |
| | DV | | | |
| | VSP | | (VSP inheritance) | |
| | $A_0$ | $A_0$ | $A_0$ | $A_0$ |
| | $B_2$ | $B_2$ | $B_2$ | $B_2$ |
| | Shift IVMP | | | |
| | Shift DV | | | |
| | Temporal | Temporal | Temporal | Temporal |
| | combined-Bi | combined-Bi | combined-Bi | combined-Bi |
| | Zero | Zero | Zero | Zero |
| #merge cand. | 13 | 11 | 8 | 8 |

Therefore, in current 3D-HEVC, there are four different kinds of Merge candidate sets:
1. Independent-view texture and depth map with PU size equal to 8×4 or 4×8: HEVC candidate sets for both texture and depth data.
2. Independent-view texture and depth map with PU size equal to or larger than 8×8: HEVC candidate sets for texture data and 3D-HEVC for depth data.
3. Dependent-view texture and depth map with PU size larger or equal to 8×8: 3D-HEVC candidate sets for both texture and depth data.
4. Dependent-view texture and depth map with PU size equal to 8×4 or 4×8: HEVC candidate sets+VSP inheritance for texture data and HEVC candidate sets for depth data.

The classification of Merge candidate sets in the draft 3D-HEVC standard version 11.0 are illustrated in Table 3.

TABLE 3

| | Texture | Depth |
|---|---|---|
| Base view PU >= 8 × 8 | HEVC Merge candidates | 3D-HEVC Merge candidates |
| Base view PU = 4 × 8 or 8 × 4 | HEVC Merge candidates | HEVC Merge candidates |
| Dependent view PU >= 8 × 8 | 3D-HEVC Merge candidates | 3D-HEVC Merge candidates |
| Dependent view PU = 4 × 8 or 8 × 4 | HEVC candidates plus VSP inheritance candidate | HEVC Merge candidates |

In the current 3D-HEVC specification, there are three control flags in Video Parameter Set extension 2 (VPS_extension2) to control the on/off for those extra candidates as summarized as follows:
iv_mv_pred_flag: controls the on/off of the IVMP, DV, shift IVMP, and shift DV candidates.
mpi_flag: controls the on/off of the MPI candidate and DDD candidate.
view_synthesis_pred_flag: controls the on/off of the VSP candidate.

In existing 3D-HEVC practice, the 3D Merge candidate enabling flags are signaled in VPS (video parameter set). The syntax in VPS_extension2 according to the existing 3D-HEVC is shown in Table 4. For texture and depth data associated with the VPS will enable respective 3D Merge candidates according to the 3D Merge candidate enabling flags. These 3D Merge candidates enabled can be inserted into the merge list according to a priority order.

TABLE 4

| vps_extension2( ) { | Note |
|---|---|
|   while( !byte_aligned( ) ) | |
|     vps_extension_byte_alignment_reserved_one_bit | |
|   for( i = 1; i <= vps_max_layers_minus1; i++ ) { | |
|     layerId = layer_id_in_nuh[ i ] | |
|     iv_mv_pred_flag[ layerId ] | (4-1) |
|     iv_mv_scaling_flag[ layerId ] | |
|     if ( !VpsDepthFlag[ layerId ] ) { | |
|       log2_sub_pb_size_minus3[ layerId ] | |
|       iv_res_pred_flag[ layerId ] | |
|       depth_refinement_flag[ layerId ] | |
|       view_synthesis_pred_flag[ layerId ] | (4-2) |
|       depth_based_blk_part_flag[ layerId ] | |
|     } else { | |
|       mpi_flag[ layerId ] | (4-3) |
|       log2_mpi_sub_pb_size_minus3[ layerId ] | |
|       dmm_cpredtex_flag[ layerId ] | |
|       intra_sdc_dmm_wfull_flag[ layerId ] | |
|       lim_qt_pred_flag[ layerId ] | |
|       inter_sdc_flag[ layerId ] | |
|     } | |
|   } | |
|   cp_precision | |
|   .... | |
| } | |

In Table 4, iv_mv_pred_flag[layerId] (as indicated by note (4-1)) indicates whether inter-view motion parameter prediction is used in the decoding process of the layer with nuh_layer_id equal to layerId. iv_mv_pred_flag[layerId] equal to 0 specifies that inter-view motion parameter prediction is not used for the layer with nuh_layer_id equal to layerId. iv_mv_pred_flag[layerId] equal to 1 specifies that inter-view motion parameter prediction may be used for the layer with nuh_layer_id equal to layerId. When not present, the value of iv_mv_pred_flag[layerId] is inferred to be equal to 0. When NumDirectRefLayers[layerId] is equal to 0, the value of iv_mv_pred_flag[layerId] shall be equal to 0.

In Table 4, view_synthesis_pred_flag[layerId] (as indicated by note (4-2)) equal to 0 specifies that view synthesis prediction Merge candidates are not used for the layer with nuh_layer_id equal to layerId. view_synthesis_pred_flag[layerId] equal to 1 specifies that view synthesis prediction Merge candidates might be used for the layer with nuh_layer_id equal to layerId. When not present, the value of view_synthesis_pred_flag[layerId] is inferred to be equal to 0. When NumDirectRefLayers[layerId] is equal to 0, the value of view_synthesis_pred_flag[layerId] shall be equal to 0.

In Table 4, mpi_flag[layerId] (as indicated by note (4-3)) equal to 0 specifies that motion parameter inheritance is not used for the layer with nuh_layer_id equal to layerId. mpi_flag[layerId] equal to 1 specifies that motion parameter inheritance may be used for the layer with nuh_layer_id equal to layerId. When not present, the value of mpi_flag [layerId] is inferred to be equal to 0.

The size of the Merge candidate list is signaled in the bitstream using syntax element, five_minus_max_num_ merge_cand, which specifies the maximum number of merging MVP candidates supported in the slice subtracted from 5. The variable NumExtraMergeCand representing the number of extra Merge candidates is derived as follows:

NumExtraMergeCand=iv_mv_pred_flag[nuh_layer_id]||mpi_flag[nuh_layer_id].

As is well known in the field, the "||" symbol represents logic "OR" operation. In other words, if any of iv_mv_pred_flag[nuh_layer_id] and mpi_flag[nuh_layer_id] has a value of 1, NumExtraMergeCand is equal to 1. The maximum number of merging MVP candidates, MaxNumMergeCand is derived as follows:

MaxNumMergeCand=5−five_minus_max_num_merge_cand+NumExtraMergeCand, where the value of MaxNumMergeCand is in the range of 1 to (5+NumExtraMergeCand), inclusive.

According to the existing 3D-HEVC specification, the size of the candidate list is increased by 1 in order to allow more Merge candidates included in the Merge list. For example, while the size of candidate list for the base view is 5, the size of candidate list in dependent texture views and depth map is 6. Whether to increase the candidate list by 1 depends only on the 3D Merge candidate enabling flags, iv_mv_pred_flag and mpi_flag.

SUMMARY

A method and apparatus for 3D (three-dimensional) and multi-view video encoding or decoding of dependent-view texture or dependent/base-view depth data using Merge mode with modified list size according to one or more 3D enabling flags are disclosed. An extra-candidate-number associated with one or more extra Merge candidates for the current block is determined according to one or more 3D enabling flags comprising a VSP (view synthesis prediction) flag. The VSP flag indicates whether view synthesis prediction is enabled for the current block. A modified list size for a 3D Merge list corresponding to a sum of the extra-candidate-number and an original list size is determined. The original list size corresponds to a base-view list size for a base-view Merge list, a default size or a transmitted size. The 3D Merge list with the modified list size is then determined based on original Merge candidates used to derive the base-view Merge list for video data in a base view and one or more 3D Merge candidates as enabled by the 3D enabling flags according to a priority order. The current block is then encoded or decoded using Merge mode based on the 3D Merge list derived.

The base-view list size for the base-view Merge list can be signaled in a bitstream. In one embodiment, the extra-candidate-number is set to one if any of the 3D enabling flags has a value of one. In another embodiment, the extra-candidate-number is set to one if any of the VSP flag, IVMP (Inter-view motion prediction) flag and MPI (motion parameter inheritance) flag is one. In yet another embodiment, the extra-candidate-number is set to the total number of 3D enabling flags having a value equal to one. For example, the extra-candidate-number can be set to the sum of values of the VSP flag, IVMP flag and MPI flag. In one embodiment, the extra-candidate-number is set to one or is incremented by one if the VSP flag is one.

The 3D Merge list can be updated for each CTU (coding tree unit), LCU (largest coding unit), PU (prediction unit), CU (coding unit), slice, picture, layer, view, or sequence.

In another embodiment, the extra-candidate-number is determined according to one or more 3D Merge candidates being enabled by one or more 3D enabling flags for the current block. For example, the extra-candidate-number can be set to one if any of the 3D Merge candidates is enabled by the 3D enabling flags. Alternatively, the extra-candidate-number can be set to the total number of the 3D Merge candidates enabled by the 3D enabling flags.

In yet another embodiment, the extra-candidate-number is determined at a prediction unit (PU) level. In particular, the extra-candidate-number is determined according to whether only non-3D Merge candidates or according to whether only said non-3D Merge candidates and VSP (view synthesis prediction) inheritance candidate are used for the current prediction unit. For example, the extra-candidate-number for the current prediction unit is set to zero if only the non-3D Merge candidates are allowed for the current prediction unit. In another example, the extra-candidate-number for the current prediction unit is set to zero if only the non-3D Merge candidates and the VSP inheritance candidate are allowed for the current prediction unit.

DETAILED DESCRIPTION

Figure 1A:
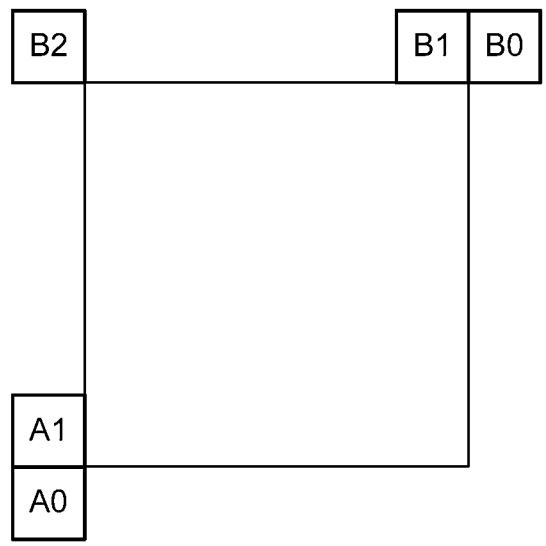
FIGS. 1A-B illustrate respective spatial neighboring blocks and temporal neighboring blocks of a current block for deriving Merge candidates for base-view texture data.
Figure 1B:
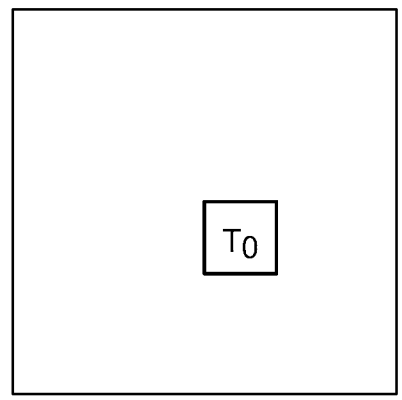

The following description is of the best-contemplated mode of carrying out the invention. This description is made for the purpose of illustrating the general principles of the invention and should not be taken in a limiting sense. The scope of the invention is best determined by reference to the appended claims.

In the conventional 3D-HEVC, the view_synthesis_pred_flag was not considered during the decision regarding whether to increase the candidate list size to include extra candidates. The inclusion of view_synthesis_pred_flag for decision related to whether to increase the candidate list should provide additional design flexibility and may improve coding performance. Accordingly, embodiments of the present invention consider the view_synthesis_pred_flag in the derivation of the Merge candidate list size for the dependent view textures and the depth map.

First Embodiment

According to this embodiment, the variable NumExtraMergeCand (also referred to as "extra-candidate-number") and maximum number of merging MVP candidates (i.e., MaxNumMergeCand) are derived as follows:

NumExtraMergeCand=iv_mv_pred_flag[nuh_layer_id]||mpi_flag[nuh_layer_id]||view_synthesis_pred_flag[nuh_layer_id];

MaxNumMergeCand=5−five_minus_max_num_merge_cand+NumExtraMergeCand.

In other words, if any of 3D enabling flags including the iv_mv_pred_flag, mpi_flag, view_synthesis_pred_flag is true, the NumExtramergeCand is set to 1. The size of Merge candidate list for the dependent view textures or the depth map is increased by 1. While three 3D enabling flags (i.e., the iv_mv_pred_flag, mpi_flag, view_synthesis_pred_flag) are used as an example, other 3D enabling flags may also be used. As mentioned before, variable NumExtraMergeCand represents the number of extra Merge candidates allowed for coding dependent-view texture data in a dependent view or for depth data in both base view and dependent view in addition to the original list size. The original list size may correspond to the Merge list size for the base-view texture data according to a regular coding system such as the conventional HEVC standard for regular video data, where the Merge list size for the base-view texture data can be signaled in a bitstream. The original list size may also correspond to a default Merge list size or a transmitted Merge list size. The original list size described for the first embodiment also applied to other embodiments in this disclosure.

Second Embodiment

According to this embodiment, the variable NumExtraMergeCand and maximum number of merging MVP candidates (i.e., MaxNumMergeCand) are derived as follows:

NumExtraMergeCand=iv_mv_pred_flag[nuh_layer_id]+mpi_flag[nuh_layer_id]+view_synthesis_pred_flag[nuh_layer_id];

MaxNumMergeCand=5−five_minus_max_num_merge_cand+NumExtraMergeCand.

As shown above, the NumExtraMergeCand equals to the sum of the values of iv_mv_pred_flag[nuh_layer_id], mpi_flag[nuh_layer_id] and view_synthesis_pred_flag[nuh_layer_id]. Since each flag has a value of 0 or 1, the NumExtraMergeCand corresponds to the number of 3D enabling flags that have a value of 1. The size of Merge candidate list for the dependent view textures or the depth map is derived as the size of Merge candidate list for the base view plus NumExtramergeCand. While three 3D enabling flags (i.e., the iv_mv_pred_flag, mpi_flag, view_synthesis_pred_flag) are used as an example, other 3D enabling flags may also be used.

Third Embodiment

According to this embodiment, the variable NumExtraMergeCand is set to 1 if the VSP candidate is enabled in the current slice or picture. The size of Merge candidate list for the dependent view textures or the depth map is derived as the size of Merge candidate list for the base view plus NumExtramergeCand. The maximum number of merging MVP candidates, MaxNumMergeCand is derived as follows:

MaxNumMergeCand=5−five_minus_max_num_merge_cand+NumExtraMergeCand.

Fourth Embodiment

According to this embodiment, the variable NumExtraMergeCand is increased by 1 if the VSP candidate is enabled in the current slice or picture. For example, the initial value of the variable NumExtraMergeCand can be determined without the consideration of the view_synthesis_pred_flag firstly and then increased by 1 if the VSP candidate is enabled by the view_synthesis_pred_flag. The size of Merge candidate list for the dependent view textures or the depth map is derived as the size of Merge candidate list for the base view plus NumExtramergeCand. The maximum number of merging MVP candidates, MaxNumMergeCand is derived as follows:

MaxNumMergeCand=5−five_minus_max_num_merge_cand+NumExtraMergeCand.

Fifth Embodiment

According to this embodiment, the variable NumExtraMergeCand is derived as the total number of available extra candidates (e.g. the IVMP, DV, shift IVMP, shift DV candidates, MPI candidate, DDD candidate, and VSP candidate) that are enabled by respective 3D enabling flags in the current slice or picture. The size of Merge candidate list for the dependent-view textures or the depth map is derived as the size of Merge candidate list for the base view plus NumExtramergeCand. The maximum number of merging MVP candidates, MaxNumMergeCand is derived as follows:

MaxNumMergeCand=5−five_minus_max_num_merge_cand+NumExtraMergeCand.

Sixth Embodiment

According to this embodiment, the variable NumExtraMergeCand is set to 1 if any one of the extra candidates is enabled by respective 3D enabling flags in the current slice or picture. The extra candidates may include the IVMP, DV, shift IVMP, shift DV candidates, MPI candidate, DDD candidate, and VSP candidate. Otherwise, the variable NumExtraMergeCand is set to 0. The size of Merge candidate list for the dependent view textures or the depth map is derived as the size of Merge candidate list for the base view plus NumExtramergeCand. The maximum number of merging MVP candidates, MaxNumMergeCand is derived as follows:

MaxNumMergeCand=5−five_minus_max_num_merge_cand+NumExtraMergeCand.

Seventh Embodiment

According to this embodiment, the variable NumExtraMergeCand is PU-adaptive. For each PU, if only non-3D merge candidates, such as HEVC merging candidates are used, the NumExtraMergeCand is set to zero. Otherwise, the variable NumExtraMergeCand is determined according to any of the previous proposed methods. For each PU, the maximum number of merging MVP candidates, MaxNumMergeCand is derived as follows:

MaxNumMergeCand=5−five_minus_max_num_merge_cand+NumExtraMergeCand.

Eighth Embodiment

According to this embodiment, the variable NumExtraMergeCand is PU-adaptive. For each PU, if only non-3D merge candidates and VSP inheritance candidates are used, the NumExtraMergeCand is set to zero. The VSP inheritance candidate corresponds to a merged candidate that is VSP coded. Accordingly, the current block inherits the motion information (i.e., VSP) from the merged neighboring block. Otherwise, the variable NumExtraMergeCand is determined according to any of the previous proposed methods. For each PU, the maximum number of merging MVP candidates, MaxNumMergeCand is derived as follows:

MaxNumMergeCand=5−five_minus_max_num_merge_cand+NumExtraMergeCand.

In the above embodiments, the 3D Merge list can be updated for each CTU (coding tree unit), LCU (largest coding unit), PU (prediction unit), CU (coding unit), slice, picture, layer, view, or sequence.

Figure 2:
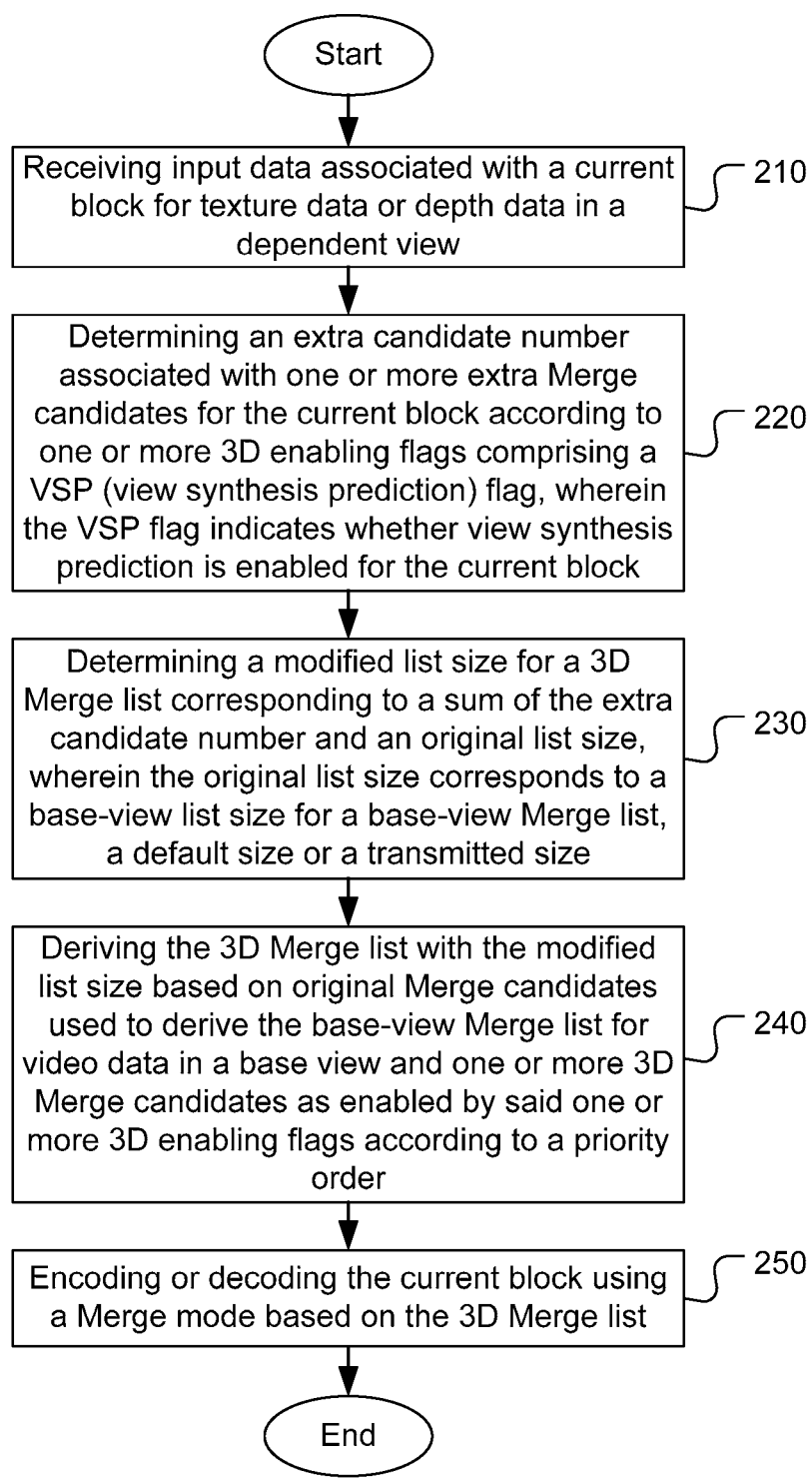
FIG. 2 illustrates an exemplary flowchart of three-dimensional (3D) and multi-view coding for dependent-view texture or depth data incorporating a 3D Merge list with modified list size according to an embodiment of the present invention.

FIG. 2 illustrates an exemplary flowchart of three-dimensional (3D) and multi-view coding for dependent-view texture or depth data incorporating a 3D Merge list with modified list size according to an embodiment of the present invention. The system receives input data associated with a current block for texture data in a dependent view or depth data in the dependent or base view as shown in step 210. For encoding, input data corresponds to the texture data in the dependent view or depth data in the base view or the dependent view to be coded. For decoding, the input data corresponds to the coded texture data in the dependent view or coded depth data in the base view or dependent view to be decoded. The input data may be retrieved from memory (e.g., computer memory, buffer (RAM or DRAM) or other media) or from a processor. An extra-candidate-number associated with one or more extra Merge candidates for the current block is determined according to one or more 3D enabling flags comprising a VSP (view synthesis prediction) flag in step 220. The VSP flag indicates whether view synthesis prediction is enabled for the current block. A modified list size for a 3D Merge list corresponding to a sum of the extra-candidate-number and an original list size is determined in step 230. The original list size corresponds to a base-view list size for a base-view Merge list, a default size or a transmitted size. The 3D Merge list with the modified list size is derived based on original Merge candidates used to derive the base-view Merge list for video data in a base view and one or more 3D Merge candidates as enabled by said one or more 3D enabling flags according to a priority order in step 240. The current block is then encoded or decoded using a Merge mode based on the 3D Merge list.

The flowchart shown above is intended to illustrate examples of 3D (three-dimensional) or multi-view video encoding or decoding according an embodiment of the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for 3D (three-dimensional) or multi-view video encoding or decoding, the method comprising:
receiving input data associated with a current block for texture data in a dependent view, or for depth data in the dependent view or a base view;
determining an extra-candidate-number associated with one or more extra Merge candidates for the current block according to one or more 3D enabling flags comprising a VSP (view synthesis prediction) flag, wherein the VSP flag indicates whether view synthesis prediction is enabled for the current block;
determining a modified list size for a 3D Merge list corresponding to a sum of the extra-candidate-number and an original list size, wherein the original list size corresponds to a base-view list size for a base-view Merge list, a default size or a transmitted size;
deriving the 3D Merge list with the modified list size based on original Merge candidates used to derive the base-view Merge list for video data in a base view and one or more 3D Merge candidates as enabled by said one or more 3D enabling flags according to a priority order; and
encoding or decoding the current block using a Merge mode based on the 3D Merge list.

2. The method of claim 1, wherein the base-view list size for the base-view Merge list is signaled in a bitstream.

3. The method of claim 1, wherein the extra-candidate-number is set to one if any of the VSP flag, IVMP (Inter-view motion prediction) flag and MPI (motion parameter inheritance) flag is one, wherein the IVMP flag indicates whether Inter-view motion prediction is enabled for the current block and the MPI flag indicates whether motion parameter inheritance is enabled for the current block.

4. The method of claim 1, wherein the extra-candidate-number is set to one if the VSP flag is one.

5. The method of claim 1, wherein the extra-candidate-number is set to a sum of values of the VSP flag, IVMP (Inter-view motion prediction) flag and MPI (motion parameter inheritance) flag, wherein the IVMP flag indicates whether Inter-view motion prediction is enabled for the current block and the MPI flag indicates whether motion parameter inheritance is enabled for the current block.

6. The method of claim 1, wherein the extra-candidate-number is incremented by one if the VSP flag is one.

7. The method of claim 1, wherein the extra-candidate-number is set to one if any of said one or more 3D enabling flags has a value of one.

8. The method of claim 1, wherein the extra-candidate-number is set to a total number of said one or more 3D enabling flags having a value of one.

9. The method of claim 1, wherein the modified list size for the 3D Merge list corresponds to the sum of the extra-candidate-number and the base-view list size for the base-view Merge list if the VSP flag is one.

10. The method of claim 1, wherein the modified list size for the 3D Merge list corresponds to the sum of the extra-candidate-number and the base-view list size for the base-view Merge list.

11. The method of claim 1, wherein the 3D Merge list is updated for each CTU (coding tree unit), LCU (largest coding unit), PU (prediction unit), CU (coding unit), slice, picture, layer, view, or sequence.

12. A method for 3D (three-dimensional) or multi-view video encoding or decoding, the method comprising:
receiving input data associated with a current block for texture data in a dependent view, or for depth data in the dependent view or a base view;
determining an extra-candidate-number associated with one or more extra Merge candidates for the current block according to one or more 3D Merge candidates being enabled by one or more 3D enabling flags for the current block;
determining a modified list size for a 3D Merge list corresponding to a sum of the extra-candidate-number and an original list size, wherein the original list size corresponds to a base-view list size for a base-view Merge list, a default size or a transmitted size;
deriving the 3D Merge list with the modified list size based on original Merge candidates used to derive the base-view Merge list for video data in a base view and said one or more 3D Merge candidates according to a priority order; and
encoding or decoding the current block using a Merge mode based on the 3D Merge list.

13. The method of claim 12, wherein the extra-candidate-number is set to one if any of said one or more 3D Merge candidates is enabled by said one or more 3D enabling flags.

14. The method of claim 12, wherein the extra-candidate-number is set to a total number of said one or more 3D Merge candidates enabled by said one or more 3D enabling flags.

15. The method of claim 12, wherein the 3D Merge list is updated for each CTU (coding tree unit), LCU (largest coding unit), PU (prediction unit), CU (coding unit), slice, picture, layer, view, or sequence.

16. A method for 3D (three-dimensional) or multi-view video encoding or decoding, the method comprising:
receiving input data associated with a current prediction unit for texture data in a dependent view, or for depth data in the dependent view or a base view;
determining an extra-candidate-number associated with one or more extra Merge candidates for the current prediction unit according to whether only non-3D Merge candidates or according to whether only said non-3D Merge candidates and VSP (view synthesis prediction) inheritance candidate are used for the current prediction unit;
determining a modified list size for a 3D Merge list corresponding to a sum of the extra-candidate-number and an original list size, wherein the original list size corresponds to a base-view list size for a base-view Merge list, a default size or a transmitted size;
deriving the 3D Merge list with the modified list size based on original Merge candidates used to derive the base-view Merge list for video data in a base view and one or more 3D Merge candidates according to a priority order; and
encoding or decoding the current prediction unit using a Merge mode based on the 3D Merge list.

17. The method of claim 16, wherein the extra-candidate-number for the current prediction unit is set to zero if only the non-3D Merge candidates are allowed for the current prediction unit.

18. The method of claim 16, wherein the extra-candidate-number for the current prediction unit is set to zero if only the non-3D Merge candidates and the VSP inheritance candidate are allowed for the current prediction unit.

19. The method of claim 16, wherein the 3D Merge list is updated for each CTU (coding tree unit), LCU (largest coding unit), PU (prediction unit), CU (coding unit), slice, picture, layer, view, or sequence.

* * * * *